April 24, 1934.  F. PHILABERT  1,956,132
APPARATUS FOR THE TREATMENT OF LIQUIDS
Filed May 10, 1932
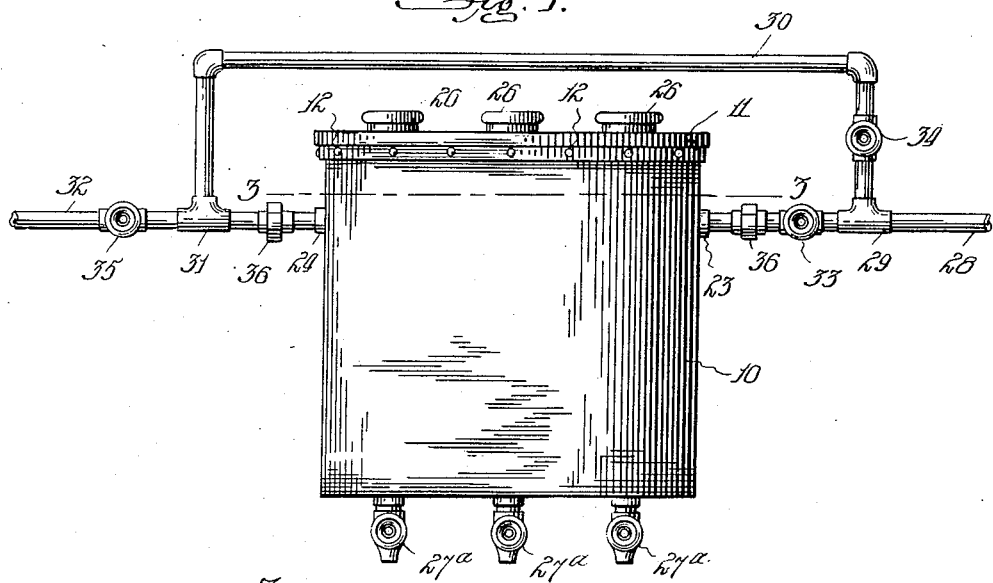
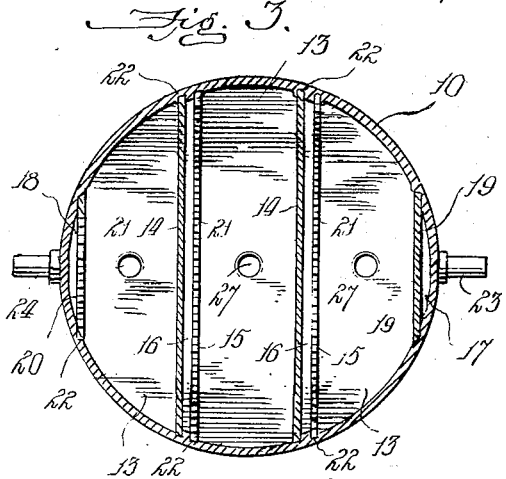
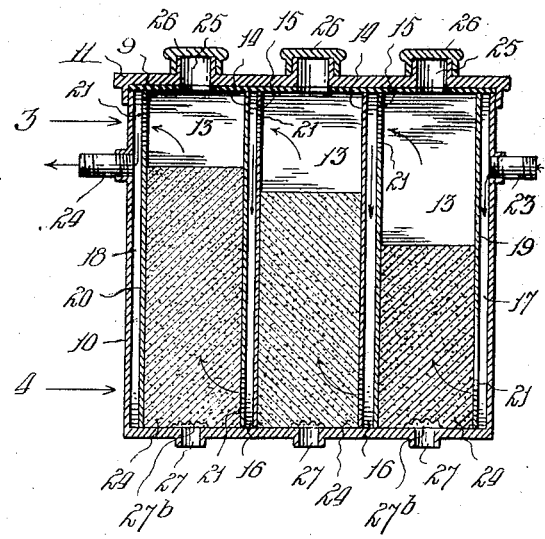
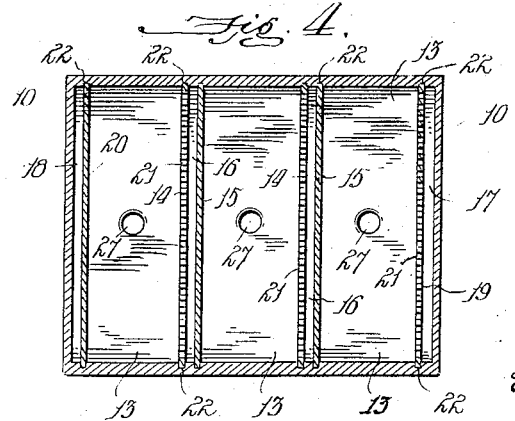
Inventor:-
Frank Philabert.
By — Gomee O'Neall
Attorney.

Patented Apr. 24, 1934

1,956,132

UNITED STATES PATENT OFFICE 1,956,132

APPARATUS FOR THE TREATMENT OF LIQUIDS

Frank Philabert, Birmingham, Ala.

Application May 10, 1932, Serial No. 610,437

1 Claim. (Cl. 210—135)

My invention relates to apparatus for the treatment of liquids in filtering water or treating water and other liquids with chemicals for any particular use required.

My invention therefore contemplates the construction of an apparatus to provide a plurality of chambers containing material for the treatment of the liquid and through which the liquid is directed from one end to the other of each chamber and in which the construction of the apparatus is such that the filtering material or chemicals can be easily and conveniently washed when desired and the apparatus thoroughly cleaned when it is used for purifying water and for other special purposes.

With this main object in view my invention consists essentially of a tank having chambers separated by double partitions or plates between said chambers and at the sides of the tank to provide vertical channels opening into the chambers at opposite ends thereof to cause the liquid to pass through the chemicals therein, with pipe connections and means associated with the tank to provide for cleaning the latter as well as give access to the different chambers for supplying the same with the material through which the liquid passes in subjecting the same to purification or other treatment.

In the accompanying drawing illustrating my invention:

Figure 1 is a side elevation of the apparatus.

Fig. 2 is a detail sectional view through the tank.

Fig. 3 is a sectional view on the line 3—3 of Fig. 1, and

Fig. 4 is a sectional view illustrating a modification in the shape of the tank.

In carrying out my invention I employ a tank 10 preferably cylindrical in shape and provided with a lid or cover 11 having a depending flange for securing it in place by means of bolts 12 with a gasket 9 interposed between the lid and upper end of the body of the tank. This tank is divided into a plurality of chambers 13 by double walled partitions each consisting of two plates 14, 15 spaced apart to leave a space forming a narrow channel 16, like channels 17, 18 being formed at opposite sides of the tank by plates 19, 20 spaced from the side wall of said tank, and it will be noted by reference to the drawing that each of the partition plates is provided near one end with a perforated portion 21 extending transversely across the plate for the passage of the liquid. These plates are removable by slidable engagement with vertical grooves 22 in the side walls of the tank and are arranged so that the liquid will enter the chambers at the bottom thereof and pass out at the upper end taking a circuitous route through the channels and chambers so as to pass through the material in the chambers successively; that is to say the liquid passing into the tank through the inlet 23 will flow down channel 17 and into the bottom portion of the first chamber 13 through the perforations 21 in wall 19 and passing upward in said chamber will pass into the circulating channel 16 through the perforations 21 in the upper part of partition plate 15, and in like manner the liquid will pass through the other chambers in succession leaving the tank through an outlet 24. The several chambers may be supplied with any material desired for the treatment of the liquid, and in order to gain access to said chambers for the purpose of supplying the same with the material desired, indicated generally by the reference 24a, the lid is provided with clean-out openings 25 covered by caps 26, said openings being continued through the gasket 9, and for draining the chambers discharge openings 27 in the bottom thereof covered by strainers 27b are provided and controlled by pet cocks 27a.

To facilitate the washing or cleaning of the material in the chambers as well as for changing the material for the treatment of liquid I provide a particular arrangement of pipe connections between the inlet and outlet openings of the tank, and by reference to Fig. 1 of the drawing it will be observed that the water or liquid supply pipe 28 is connected directly to one member of a T-coupling 29 one of the other members of which latter is connected to the inlet 23 while the third member communicates with a by-pass pipe 30 leading to a T-coupling 31 connected to the outlet 24 of the tank and to a discharge pipe 32 through which latter the liquid after being treated in the apparatus is conducted for use. With this arrangement of pipe connections I interpose a valve or cut-off 33 between the coupling 29 and inlet 23, a valve or cut-off 34 in the by-pass 30, and a valve or cut-off 35 in the discharge pipe 32 beyond the connection of the by-pass with the tank, whereby in the operation of the apparatus in the treatment of liquids valves 33 and 35 being open and valve 34 closed the liquid will pass from the supply pipe 28 directly to the tank and will be led from the tank directly to the distributing pipe 32. On the other hand when it is desired to flush the material in the chambers or clean the same or sludge and other foreign matter valves 33 and 35 are closed and valve 34 opened so that the circulation of the liquid through the tank will be reversed and the chambers flushed successively by opening and closing the pet-cocks 27a, the reversing of the flow from top to bottom of each chamber washing the sludge, sediment, etc. out through the strainers and discharge opening at the bottom of the chamber. The strainers over the discharge openings are preferably of a fine mesh to prevent loss of the chemicals or other materials used, and it will be noted that both in the operation of the apparatus in treating liquids as well as in washing the chemicals the small perforations in the partition plates will break the stream of liquid into sprays to act more effectively on the material in the chambers.

When it is desired to thoroughly clean the tank including the surface of the channels 16, 17, and 18 as well as the inner surface of the cylindrical tank the parts may be disassembled by removing the cover or lid permitting the partition plates to be withdrawn by sliding them out of the grooves in the cylindrical side wall of the tank, and as these plates are reversible they may be arranged to reverse the flow through the tank; that is to say when said plates are reversed from the positions shown in the drawing the liquid entering the tank from the inlet 23 will pass directly into the upper part of the first chamber to pass downward through the material therein and enter the channel 16 at the lower end thereof to pass upward in said channel so as to discharge into the upper part of the second chamber, and so on.

Although I have shown the apparatus with a capacity of three chambers it will be understood that the number may be increased, and that the construction hereinbefore described may be employed in connection with a tank rectangular in shape as shown in Fig. 4 instead of cylindrical as shown in Fig. 3. Furthermore, I wish it to be understood that any materials desired may be used in the apparatus for filtering liquids by absorption or for imparting proportional quantities of matter that will be absorbed by the liquid passing through the mass contained in the chambers, and of course the pressure of flow through the apparatus can be regulated by manipulation of the valve 33 connecting with the inlet to the tank according to the nature of the chemicals or substance through which the water passes in the treatment of the same. Consequently the apparatus may be used for various purposes, as for instance to clarify and soften water or to impart any chemical thereto for the purpose of purification or for coloring any liquid according to the uses for which it may be desired.

I claim:—

An apparatus for the treatment of liquid comprising a tank divided into chambers, double walled vertical partitions separating the chambers from each other by narrow channels and vertical walls near the opposite sides of the tank forming narrow channels for the passage of the liquid into and out of the adjoining chambers, respectively, the partitions forming the side walls of the chambers having perforations at the upper end of one partition and the lower end of the other partition for directing the flow of liquid from one end of a chamber to the other end thereof, a liquid supply pipe connected to the channel at one side of the tank, a liquid discharge pipe connected to the channel at the other side of said tank, and a by-pass pipe extending around the tank from the supply pipe to the discharge pipe; together with a valve in the by-pass pipe, a valve in the supply pipe between the by-pass and tank, and a valve in the discharge pipe beyond the connection of the by-pass with said discharge pipe, the bottom of the tank having screened outlets with draw-off cocks.

FRANK PHILABERT.